(12) United States Patent
Perkins

(10) Patent No.: US 9,493,033 B2
(45) Date of Patent: Nov. 15, 2016

(54) AIRCRAFT WHEEL BEARING ARRANGEMENT

(71) Applicant: Borealis Technical Limited, North Plains, OR (US)

(72) Inventor: Scott Perkins, Kent, WA (US)

(73) Assignee: Borealis Technical Limited, Gibraltar (GI)

( * ) Notice: Subject to any disclaimer, the term of this patent is extended or adjusted under 35 U.S.C. 154(b) by 32 days.

(21) Appl. No.: 14/398,450

(22) PCT Filed: May 1, 2013

(86) PCT No.: PCT/IB2013/001905
§ 371 (c)(1),
(2) Date: Dec. 31, 2014

(87) PCT Pub. No.: WO2013/186635
PCT Pub. Date: Dec. 19, 2013

(65) Prior Publication Data
US 2015/0108822 A1 Apr. 23, 2015

Related U.S. Application Data

(60) Provisional application No. 61/641,868, filed on May 2, 2012.

(51) Int. Cl.
| | |
|---|---|
| *B60B 19/00* | (2006.01) |
| *B60B 27/00* | (2006.01) |
| *B60B 19/06* | (2006.01) |
| *B60B 37/10* | (2006.01) |
| *B64C 25/36* | (2006.01) |

(Continued)

(52) U.S. Cl.
CPC ............. *B60B 27/001* (2013.01); *B60B 19/06* (2013.01); *B60B 27/0047* (2013.01); *B60B 27/0078* (2013.01); *B60B 37/10* (2013.01); *B64C 25/36* (2013.01); *B64C 25/405* (2013.01); *B60B 25/04* (2013.01); *B60B 2380/14* (2013.01); *B60B 2380/64* (2013.01); *B60B 2900/311* (2013.01); *B60B 2900/351* (2013.01); *B60Y 2200/51* (2013.01); *Y02T 50/823* (2013.01)

(58) Field of Classification Search
CPC ......... B60B 25/08; B60B 1/06; B60B 25/18; B64C 25/405; B64C 25/40; B64C 25/36
See application file for complete search history.

(56) References Cited

U.S. PATENT DOCUMENTS 2,335,398 A * 11/1943 Downey ................. B64C 25/40
180/55
2,408,163 A * 9/1946 Fodor ..................... B64C 25/40
244/103 S (Continued)

*Primary Examiner* — Hau Phan

(57) ABSTRACT

A bearing arrangement for an aircraft landing gear wheel is provided that effectively supports the wheel on an axle while maximizing internal wheel volume available for mounting a non-engine drive motor used to power the wheel and/or brakes or other structures within the maximized wheel volume. The bearing arrangement is preferably employed with a two-part aircraft wheel mounted on a landing gear axle and includes bearing structures located only on wheel sections adjacent to the axle. A specifically configured cantilevered joint portion of inboard and outboard wheel sections supports weight and loads bearing structures, eliminating the need for and space required by a high speed bearing. Stiffness necessary for strength and structural integrity is provided by the materials selected to form the wheel sections.

18 Claims, 1 Drawing Sheet

(51) Int. Cl.
*B64C 25/40* (2006.01)
*B60B 25/04* (2006.01)

(56) References Cited

U.S. PATENT DOCUMENTS

| | | | | |
|---|---|---|---|---|
| 2,425,583 | A * | 8/1947 | Volk | B64C 25/40 244/103 S |
| 2,430,163 | A * | 11/1947 | Dever | B64C 25/40 244/103 S |
| 3,059,712 | A * | 10/1962 | Hautau | B64C 25/405 180/10 |
| 5,409,048 | A * | 4/1995 | Kipp | B60B 25/00 152/381.4 |
| 6,657,334 | B1 | 12/2003 | Edelson | |
| 6,838,791 | B2 | 1/2005 | Edelson | |
| 7,116,019 | B2 | 10/2006 | Edelson | |
| 7,124,860 | B2 | 10/2006 | Souetre et al. | |
| 7,445,178 | B2 | 11/2008 | McCoskey et al. | |
| 7,469,858 | B2 | 12/2008 | Edelson | |
| 7,594,626 | B2 * | 9/2009 | Soderberg | B64C 25/36 244/100 R |
| 8,714,481 | B2 * | 5/2014 | Sweet | B64C 25/405 244/100 R |
| 8,833,694 | B2 * | 9/2014 | Gilleran | B64C 25/405 188/65.1 |
| 9,216,819 | B2 * | 12/2015 | Gilleran | B64C 25/405 |
| 2003/0168143 | A1 * | 9/2003 | Vehar | B60B 25/18 152/410 |
| 2004/0154880 | A1 * | 8/2004 | Guaraldo | B60T 13/741 188/71.5 |
| 2008/0251639 | A1 * | 10/2008 | Kipp | B60B 1/06 244/103 R |
| 2010/0202791 | A1 | 8/2010 | Takai et al. | |
| 2010/0290731 | A1 * | 11/2010 | Proeschel | B60B 25/08 384/589 |
| 2011/0089289 | A1 | 4/2011 | Wilson | |

* cited by examiner

AIRCRAFT WHEEL BEARING ARRANGEMENT

PRIORITY CLAIM

This application claims priority from U.S. Provisional Application No. 61/641,868, filed May 2, 2012, the disclosure of which is fully incorporated herein.

TECHNICAL FIELD

The present invention relates generally to aircraft wheel bearings and specifically to an arrangement of aircraft wheel bearings that maximizes usable space within an aircraft landing gear wheel.

BACKGROUND OF THE INVENTION

Aircraft wheels are currently designed primarily in response to requirements for accommodating selected tires as well as housing the aircraft's brakes and supporting the aircraft on a ground surface. A goal is to accomplish these functions with a wheel design that adds a minimum amount of weight to the aircraft while maximizing wheel operational life. Aircraft wheels not only help support the aircraft's weight during taxi, but, along with other landing gear structures, are required to absorb significant loads when an aircraft lands. The conditions under which aircraft wheels must operate during service, moreover, may be harsh and demanding. Aircraft wheels typically experience not only high energy braking events that can produce significant heat, but also may be subjected to carbon dust from the application of carbon brakes and fluids from the runway and aircraft. Consequently, the United States Federal Aviation Administration (FAA) and corresponding international aircraft regulatory bodies require that each aircraft main and nose landing gear wheel be submitted for approval prior to use on an aircraft. The FAA reviews such factors as maximum static and limit load ratings of each wheel, taking into consideration design maximum weight and critical center of gravity. The maximum limit load rating, for example, must equal or exceed the maximum radial limit load determined under applicable ground load requirements of the wheel. Additional requirements apply to wheels with brakes.

Aircraft landing gear wheels include bearings or bearing structures that connect and support various parts of an aircraft wheel. In comparison to the total time period when an aircraft is operating, bearings function or are loaded relatively briefly. During bearing loading phases, aircraft wheel bearings must operate with maximum reliability while they absorb extreme forces and torques, initially when the aircraft lands and then when the aircraft is taxiing. The use of aircraft brakes during taxi also applies loads on wheel bearings. It is essential that the bearing structures used in aircraft wheels be capable of operating reliably under these conditions. It is, additionally, desirable that such bearings be as lightweight and low maintenance as possible.

A variety of different bearing structures designed for use in aircraft landing gear wheels has been proposed. The location of these bearing structures depends on the type of aircraft wheel. For example, in one type of wheel configuration, known as an A-frame design, the two wheel parts are fastened together under a tire-supporting rim, and bearings are provided only where the two wheel parts contact a landing gear axle. This type of wheel leaves very little space for brakes or other structures between the tire-supporting rim and the axle. Another type of wheel configuration known as a bowl-type design provides the space needed for aircraft brakes or other structures. For large aircraft with high brake energy and heat sink requirements, however, a bowl-type wheel, although it increases an aircraft's weight, may meet these needs. This type of aircraft wheel, which usually includes multiple wheel sections, requires bearings both adjacent to the landing gear axle and between wheel parts adjacent to the tire-supporting rim of the wheel. Aircraft landing gear wheels that are essentially bowl-type in configuration to accommodate an aircraft's brakes within the wheel between the axle and tire-supporting rim and have bearings only on the axle side of the wheel are described and shown in U.S. Patent Application Publication No. 2010/0202791 by Dotzel et al. While this arrangement accommodates the wheel brakes substantially within the wheel volume, the various arrangements of the two-part wheel shown have vertical sections that require one or more fasteners to secure the parts of the wheel assembly as well as apparently to provide stiffness to the wheel. In U.S. Patent Application Publication No. 2010/0290731, Proeschel et al also show and describe aircraft wheel bearing structures located only adjacent to an axle and not adjacent to a tire-supporting rim. The wheels of Proeschel et al, however, also have structural elements that substantially fill the volume between the axle and the tire-supporting rim, including fastening structures that hold wheel parts together. The aircraft wheel braking system disclosed by Souetre et al in U.S. Pat. No. 7,124,860 has a centering bearing supporting brake structures that can be constructed with alternating zones of materials of different stiffness. None of the foregoing published patent applications or patent, however, suggests that a bearing arrangement in an aircraft landing gear wheel in which bearing structures are effectively located only in a part of the wheel adjacent to an axle without additional structure required to fasten wheel sections and provide structural integrity.

Providing motors and other drive devices to move aircraft independently on the ground without reliance on the aircraft's main engines or tow vehicles is known. Such motors and drive devices may be installed in aircraft wheels to drive or power the wheels and thereby move the aircraft during taxi. In U.S. Pat. No. 7,445,178, for example, McCoskey et al describe a powered nose aircraft wheel system with a traction motor mounted in an A-frame type wheel that rotates the wheel to drive the aircraft on the ground. Bearing structures are located only adjacent to the wheel axle, and the structures required to join and fasten the sections of the A-frame wheel completely fill most of the space between the tire rim and the axle. Wilson, in U.S. Patent Application Publication No. US2011/0089289, describes mounting an electric motor in a two-part bowl-type aircraft main wheel in space normally occupied by brakes to drive the aircraft during taxi, but does not show or describe bearing structures. An alternate location may be required for brakes. Neither McCoskey et al nor Wilson suggests an aircraft landing gear wheel configured with effective bearing structures positioned in a bowl-type wheel that maximizes volume within the wheel and provides optimal structural integrity to the wheel.

A need exists, therefore, for a bearing arrangement for an aircraft landing gear wheel that provides effective bearing support for the wheel while maximizing internal wheel volume available to incorporate a wheel drive means or other structures and optimizing wheel stiffness and structural integrity.

SUMMARY OF THE INVENTION

It is a primary object of the present invention, therefore, to provide a bearing arrangement for an aircraft landing gear wheel that provides effective bearing support for the wheel while maximizing available internal wheel volume and optimizing wheel stiffness and structural integrity.

It is another object of the present invention to provide a bearing arrangement for an aircraft landing gear wheel that minimizes the number of bearing structures required to effectively support the wheel.

It is an additional object of the present invention to provide a bearing arrangement for an aircraft landing gear wheel that is structured to hold weight of a tire mounted on the wheel and to use the weight to load bearing structures.

It is a further object of the present invention to provide a bearing arrangement for an aircraft landing gear wheel that provides structural stiffness and structural integrity to the wheel while maximizing internal wheel volume.

It is yet another object of the present invention to provide a bearing arrangement for an aircraft landing gear wheel with structure to join wheel sections that eliminates the need for a high speed bearing adjacent to the tire-supporting section of the wheel.

It is yet a further object of the present invention to provide a bearing arrangement for an aircraft landing gear wheel useful in aircraft equipped with onboard non-engine drive means controllable to move the aircraft on the ground autonomously without reliance on the aircraft's main engines or external tow vehicles that provides maximum volume within a landing gear wheel and effectively supports the drive means within the wheel volume.

In accordance with the aforesaid objects, a bearing arrangement for an aircraft landing gear wheel is provided that effectively supports the wheel on an axle while maximizing internal wheel volume available for mounting a wheel drive means and/or brakes or other structures within the maximized wheel volume. The bearing arrangement is preferably employed with a two-part aircraft wheel mounted on a landing gear axle and includes bearing structures located only on wheel sections adjacent to the axle. A specifically configured cantilevered joint portion of inboard and outboard wheel sections supports weight and loads the bearings, eliminating the need for and space required by a high speed bearing. Stiffness necessary for strength and structural integrity is provided by the materials selected to form the wheel sections.

Other objects and advantages will be apparent from the following description, drawings, and claims.

DESCRIPTION OF THE INVENTION

The present invention provides a bearing arrangement for an aircraft landing gear wheel that is designed to provide not only effective bearing support for the wheel and any structures associated with the wheel, but to maximize the internal volume within the wheel available for mounting structures within the landing gear wheel. The arrangement shown and described herein may expand both radial and axial dimensions to expand the internal volume of the wheel cavity. This expanded volume allows the effective mounting and support of drive means structures in an aircraft equipped with onboard non-engine drive means controllable to drive the wheel and move the aircraft on a ground surface without reliance on the aircraft's main engines. The expanded volume may also allow the effective mounting and support of wheel brakes within landing gear wheels not equipped with drive means.

Figure 1:
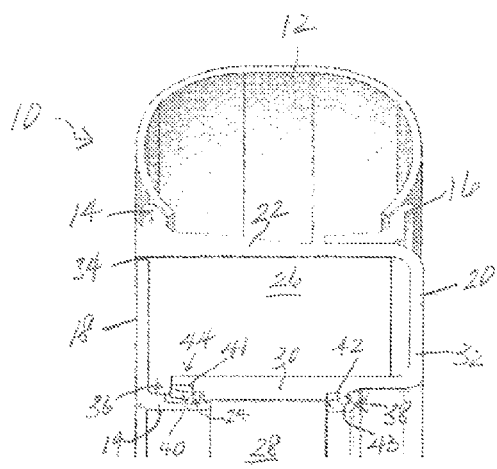
FIG. 1 is a diagram of a cross section of a portion of one configuration of an aircraft landing gear wheel in accordance with the present invention showing a tire mounted on the wheel.

Referring to the drawings, FIG. 1 shows a cross-sectional view of a portion of an aircraft landing gear wheel 10 with a tire 12 mounted on the wheel. The tire 12 may be held in place by tire flanges 14 and 16. Tire flange 16 may be demountable to facilitate tire changes. The wheel 10 of FIG. 1 may be a two-part wheel. In this design, wheel section 18 forms an inboard wheel section closest to a landing gear strut (not shown). The inboard wheel section 18 extends radially from a wheel axle 28 toward the tire 12 and includes an axial portion 19 that extends along the wheel axle toward an outboard wheel section 20. The outboard wheel section 20 and the inboard wheel section 18 define a cavity, as described below. An inboard tire flange 14 may be formed integrally with an axial portion 22 of the outboard wheel section 20 that is adjacent to the tire 12. The demountable outboard tire flange 16 may be removably fastened to the axial portion 22 of the outboard wheel section 20 to facilitate tire changes. The two wheel sections 18 and 20 may be fastened together, preferably by one or more nuts and bolts 24 or equivalent fasteners to define a cavity 26. Fastener 24 may be any type of fastener typically used to join aircraft wheel sections, including, but not limited to, nuts and bolts and other appropriate fasteners.

As shown in FIG. 1, the inboard wheel section 18 may differ significantly in length from the outboard wheel section 20. Inboard wheel section 18 may extend radially along an inboard side of the wheel 10 between a landing gear wheel axle 28 and the tire 12, and an axial portion 19 of inboard section 18 extends a relatively short distance along the axle 28 to be joined by the fastener 24 to an axial portion 30 of the outboard wheel section 20 that also extends along the wheel axle 28.

The outboard wheel section 20 may have a substantially reverse C-type configuration. The axial portion 30 extends from a connection with the inboard wheel section 18 along the axle 28, the axial portion 22 extends between the tire flanges 14 and 16, and a radial portion 32 integral with the axial portion 30 and the axial portion 22 joins these portions to form the outboard wheel section 20. The axial portion 22 joins the inboard wheel section 18 at a joint 34 near the tire flange 14.

The present bearing arrangement may include two bearing structures 36 and 38 in contact with outboard wheel section axial portion 30. These bearings may be tapered roller bearings 40 and 42, as shown, or the bearings may be angular contact ball bearings or any other type of bearings appropriate for this application. Suitable bushings 41 and 43, which may be rubber or another bushing material useful in an aircraft wheel environment, may be provided with the selected bearings. The bushings 41 around bearing 40 are located in a cantilevered joint section of the wheel as described below. The cantilevered design of the present invention supports the weight of the wheel and, in addition, loads the bearing 38 between the outboard wheel section axial portion 30 and the wheel axle 28.

Multiple part aircraft landing gear wheels typically include at least one bearing located adjacent to an inboard section of the wheel near a tire flange. In FIG. 1, such a bearing would be located at the joint 34, where the axial portion 22 of the outboard wheel section 20 meets the inboard wheel section 18. This is often a large high speed bearing that occupies a significant amount of space within the wheel. The bearing arrangement of the present invention eliminates this high speed bearing so that the space formerly occupied by the bearing is available for a drive means or for brakes or other structures related to operation of an aircraft landing gear wheel so that these structures can be mounted completely within the maximized volume 26. The weight bearing and support functions previously provided by the eliminated high speed bearing are, in the arrangement of the present invention, provided instead by the configuration of the joint 44 between axial portion 30 of the outboard wheel section 20 and the axial section 19 of the inboard wheel section 18.

Figure 2:
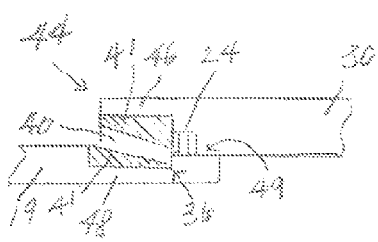
FIG. 2 is a schematic diagram of a cross section of a portion of a bearing of the bearing arrangement of the present invention.

FIG. 2 illustrates the joint 44 between axial portion 30 of the outboard wheel section 20 and axial portion 19 of the inboard wheel section 18. An extension 46 of axial portion 30 extends in an inboard direction, and an extension 48 of axial portion 19 extends in an outboard direction so that extension 46 and extension 48 overlap in the area of the bearing structure 36, forming a cantilevered section. This cantilevered section of joint 44 is designed to hold weight previously borne by a high speed bearing, which has been eliminated as described above. The cantilevered design of the present invention not only holds weight and loads bearing 36, but also loads bearing 38. As noted above, suitable bushings 41 may be provided around the bearing 40. Other structures or materials, such as rubber or the like, may additionally be positioned between extensions 46 and 48 at an overlap area 49.

The joint 34 (FIG. 1) between the inboard wheel section 18 and the axial portion 22 of the outboard wheel section 20 may also include rubber or another suitable material where the inboard wheel section 18 joins the axial portion 22 of the outboard wheel section 20.

A low friction sacrificial coating may also be applied to one or both surfaces of extensions 46 and 48 at the contact area 49. A low friction coating may, in addition, be applied to one or both surfaces of axial portion 22 of outboard wheel bearing 20 at joint 34 where axial portion 22 overlaps the inboard wheel section 18 to allow contact at high load conditions. Any structure and/or coating that may be used to protect the interior of the wheel 10 from contamination while allowing the wheel to function under high loads is contemplated for use at joints 34 and 44.

When the bearing arrangement shown in FIGS. 1 and 2 is used in an aircraft landing gear wheel, the material from which the outboard wheel section 20 is made must have sufficient stiffness to provide the structural integrity and strength required for the wheel. Preferably, this material should be selected to provide sufficient stiffness or structural integrity and strength not only to withstand the loads and stresses to which landing gear wheels are subjected upon landing of an aircraft and during subsequent ground movement, but also to support drive means, brakes, or other structures mounted within wheel cavity 26.

In a two-part wheel, such as that shown in FIG. 1, the outboard wheel section 20, which may require more stiffness than the inboard wheel section 18, may preferably be made of a material selected primarily for its stiffness properties, such as, for example, alloys of steel or alloys of titanium, although some alloys of aluminum may also be used. Examples of suitable materials that may be used to make the wheel outboard section 20 include high strength steel alloys formulated for aerospace applications, including, for example, the nickel-cobalt steel alloys AF1410 and AerMet® 100, and various titanium alloys developed for use in aircraft landing gear components, such as, for example, beta alloys Ti-10V-2Fe-3Al and Ti-3Al-8V-6Cr-4Zr-4Mo and alpha-beta alloy Ti-6Al-4V. The aluminum alloy 2040, which has the composition Al-5, Cu-0.8, Mg-0.6, Mn-0.5, Ag-0.122, is also used in aircraft landing gear applications. These materials are exemplary, and any other materials capable of providing the desired stiffness within the operating parameters for aircraft wheel applications are also contemplated to be within the scope of the present invention. Metal alloys presently used to make aircraft landing gear wheels are typically chosen for their strength at ambient and elevated temperatures, corrosion resistance, low density and weight properties, and high fatigue behavior fracture resistance. Any suitable metal alloy or other material suitable for aircraft landing gear applications may be used in landing gear wheels in accordance with the present invention.

Figure 3:
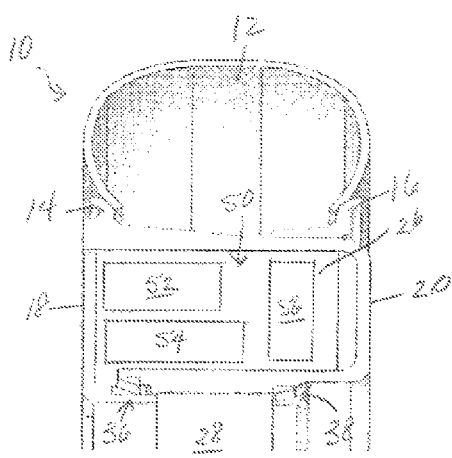
FIG. 3 is a schematic diagram of a cross section of the aircraft wheel of FIG. 1 showing drive means mounted within the wheel volume.
Figure 4:
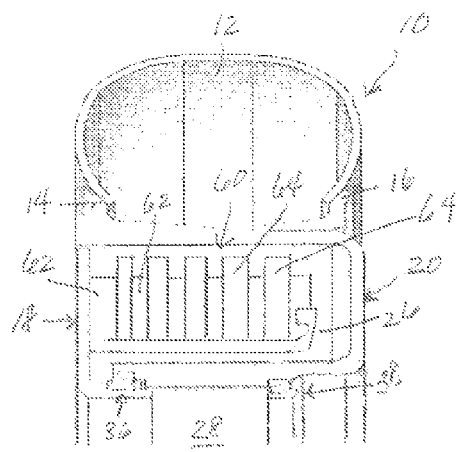
FIG. 4 is a schematic diagram of a cross section of the aircraft wheel of FIG. 1 showing brakes mounted within the wheel volume.

FIGS. 3 and 4 show, respectively, drive means 50 and a brakes assembly 60 mounted in the maximized space of cavity 26 provided by the bearing arrangement of the present invention shown in FIGS. 1 and 2, although it is contemplated that other landing gear structures may be located within the cavity 26, if desired.

FIG. 3 shows, schematically, the main components of a non-engine drive means preferred for mounting within an aircraft landing gear wheel 10 to power the wheel and drive an aircraft on ground surfaces. A non-engine drive means preferred for this use may be en electric motor and may generally include at least a stator 52, a rotor 54, and gears 56. The drive means may also include other components that are not shown. One or more drive means could be located in one or more nose landing gear or main landing gear wheels to power the wheel or wheels in which the drive means is mounted. The term "drive means" as used herein refers to any non-engine drive means useful for powering or driving an aircraft wheel, including but not limited to electric, hydraulic and pneumatic drive means. A particularly preferred drive means is a high phase order electric motor of the type described in U.S. Pat. Nos. 6,657,334; 6,838,791; 7,116,019; and 7,469,858, all of which are owned in common with the present invention. A geared motor, such as that shown and described in commonly owned U.S. Pat. No. 7,469,858, is designed to produce the torque required to move a commercial sized aircraft at an optimum speed for ground movement. The disclosures of the aforementioned patents are incorporated herein by reference. The electric power for an electric drive means is preferably supplied by the aircraft auxiliary power unit (APU), but could also be supplied by any alternative source of electric power.

When one of the electric motors described above is mounted within an aircraft wheel, it can generate heat during operation to power the wheel and move the aircraft during taxi, and this heat must be dissipated. The operation of aircraft brakes also generates heat. Forming the inboard wheel section 18 of a material with high thermal conductivity, such as, for example aluminum alloy 2040 or another suitable aluminum alloy, can effectively help to dissipate heat from the wheel interior cavity 26.

An aircraft's brakes are usually located in main landing gear wheels, although brakes could be located in nose landing gear wheels. FIG. 4 shows, schematically, a brake assembly 60 located within the maximized wheel cavity 26. The brakes shown include a series of alternating blocks 62 and discs 64. Other brake designs used for aircraft could also be adapted to fit within wheel cavity 26.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability where it is desired to provide an effective bearing arrangement for an aircraft landing gear wheel that maximizes internal wheel volume to accommodate completely within the wheel volume a drive means designed to drive an aircraft during ground travel without reliance on the aircraft's main engines. The bearing arrangement of the present invention can also be used to provide maximum internal landing gear wheel volume to effectively accommodate wheel brake assemblies completely within an aircraft landing gear wheel.

The invention claimed is:

1. A bearing arrangement for an aircraft landing gear wheel that eliminates the need for a high speed bearing and increases landing gear wheel internal volume and landing gear wheel structural integrity, comprising:
   a. an aircraft landing gear wheel comprising an inboard wheel section and an outboard wheel section extending axially along an aircraft landing gear wheel axle and radially between the axle and a tire mounted on the landing gear wheel;
   b. a landing gear wheel internal volume formed within said inboard wheel section extending axially adjacent to the axle and radially between the axle and the tire to form a joint between an outer axial portion of said outboard wheel section adjacent to the tire and said outboard wheel section extending from said outer axial portion radially between the tire and the axle and axially adjacent to the axle, wherein a connection between an inboard wheel section axial portion adjacent to the axle and an outboard wheel section axial portion adjacent to the axle comprises a cantilevered joint; and
   c. a pair of spaced bearing elements supporting the inboard and outboard wheel sections on the axle, wherein one of said bearing elements is positioned within said cantilevered joint in bearing contact between said inboard wheel section axial portion and said outboard wheel section axial portion and the other of said bearing elements is positioned in bearing contact between said outboard wheel section axial portion and the axle.

2. The bearing arrangement of claim 1, wherein said cantilevered joint comprises an axial extension of said inboard wheel section axial portion in cantilevered relationship to an axial extension of said outboard wheel section axial portion adjacent to the axle, and each of said axial extensions is configured to receive said one bearing element, wherein said one bearing element is positioned in weight bearing relationship within said cantilevered joint between each of said axial extensions.

3. The bearing arrangement of claim 2, wherein said cantilevered joint comprises a fastener element removably connecting said axial extension of said inboard wheel section axial portion with said outboard wheel section axial portion.

4. The bearing arrangement of claim 2, wherein said cantilevered joint and said pair of bearing elements are configured to absorb loads transferred to said landing gear wheel.

5. The bearing arrangement of claim 1, wherein each one of said pair of bearing elements comprises a roller bearing and bushings.

6. The bearing arrangement of claim 1, wherein said outboard wheel section is formed of a material selected to provide stiffness to said wheel structure.

7. The bearing arrangement of claim 6, wherein said outboard wheel section material comprises an alloy of steel or an alloy of titanium.

8. The bearing arrangement of claim 7, wherein said alloy of steel comprises a nickel-cobalt-steel alloy and said alloy of titanium comprises a beta titanium alloy or an alpha-beta titanium alloy.

9. The bearing arrangement of claim 1, wherein said aircraft landing gear wheel is equipped with onboard non-engine drive means controllable to move the aircraft on a ground surface during ground travel without reliance on the aircraft main engines located completely within said landing gear wheel internal volume.

10. The bearing arrangement of claim 1, wherein said aircraft landing gear wheel is equipped with wheel brakes located completely within said landing gear wheel internal volume.

11. The bearing arrangement of claim 1, wherein each of said pair of bearing elements comprises tapered roller bearings or angular contact ball bearings.

12. The bearing arrangement of claim 11, wherein said cantilevered joint comprises a tapered roller bearing and an associated bushing interposed between cantilevered extensions of said axial portion of said inboard wheel section and said axial portion of said outboard wheel section adjacent to said axle.

13. The bearing arrangement of claim 11, wherein said cantilevered joint comprises an angular contact ball bearing and bushings interposed between cantilevered extensions of said axial portion of said inboard wheel section and said axial portion of said outboard wheel section adjacent to said axle.

14. The bearing arrangement of claim 1, wherein said joint between said inboard wheel section and said outer axial portion of said outboard wheel section and said cantilevered joint comprise contact surfaces and at least one contact surface in each of said joint and said cantilevered joint comprises a coating selected to allow contact between contact surfaces while protecting said landing gear wheel internal volume from external contamination.

15. The bearing arrangement of claim 14, wherein said coating comprises a low friction coating.

16. The bearing arrangement of claim 1, wherein said inboard wheel section axial portion is shorter than said outboard wheel section axial portion adjacent to the axle.

17. The bearing arrangement of claim 1, wherein said inboard wheel section is formed of a thermally conductive material comprising aluminum alloy.

18. The bearing arrangement of claim 1, wherein said joint between said axially extending inboard wheel section and said outer axial portion of said outboard wheel section adjacent to the tire comprises contact surfaces without bearing elements.

* * * * *